US008062022B2

(12) United States Patent
Schmidt

(10) Patent No.: US 8,062,022 B2
(45) Date of Patent: Nov. 22, 2011

(54) PRESSING APPARATUS AND PRESSING METHOD FOR THE ISOSTATIC PRESSING OF A MEMBER

(75) Inventor: Hans-Christian Schmidt, Schlehdorf (DE)

(73) Assignee: Dorst Technologies GmbH & Co. KG, Kochel Am See (DE)

( * ) Notice: Subject to any disclaimer, the term of this patent is extended or adjusted under 35 U.S.C. 154(b) by 298 days.

(21) Appl. No.: 12/088,423

(22) PCT Filed: Sep. 26, 2006

(86) PCT No.: PCT/DE2006/001694

§ 371 (c)(1),
(2), (4) Date: Aug. 21, 2008

(87) PCT Pub. No.: WO2007/036210

PCT Pub. Date: Apr. 5, 2007

(65) Prior Publication Data

US 2009/0267257 A1 Oct. 29, 2009

(30) Foreign Application Priority Data

Sep. 27, 2005 (DE) ........................ 10 2005 045 976

(51) Int. Cl.
*B29C 43/10* (2006.01)

(52) U.S. Cl. .................. 425/405.2; 425/405.1; 425/419; 264/109; 264/120; 264/313

(58) Field of Classification Search .................... 264/39, 264/109, 120, 313; 425/415, 405.1, 405.2, 425/419

See application file for complete search history.

(56) References Cited

U.S. PATENT DOCUMENTS 1,755,387 A * 4/1930 Christophersen ............. 384/132

(Continued)

FOREIGN PATENT DOCUMENTS

DE 16 04 492 A1 12/1970

(Continued)

OTHER PUBLICATIONS

DE 1604492, machine translation Dec. 10, 1970.*

(Continued)

*Primary Examiner* — Christina Johnson
*Assistant Examiner* — Elizabeth Royston
(74) *Attorney, Agent, or Firm* — Knobbe Martens Olson & Bear LLP

(57) ABSTRACT

The invention relates to a pressing device, respectively to a corresponding pressing method, for isostatic pressing of a body (8) from powdery and/or granulated material (3), comprising a die (1) with a die wall (6) forming a forming space (2) and with a die opening (5) from outside the die through the die wall into the forming space (2) for filling the forming space (2) with the material and for removing the body pressed therein after pressing, with the die wall being made from elastic material, for compacting the material (3) by an isostatic compacting pressure (p) applied to the outside of the die wall, and a punch (4) for closing the die opening during pressing, with the punch (4) being constituted by a metallic insert (13) in longitudinal direction and an elastic jacket (14) surrounding the metallic insert (13), with an front end section (7) of the insert (13) penetrating into the forming space while closing the die opening.

21 Claims, 2 Drawing Sheets

U.S. PATENT DOCUMENTS

Figure 1:
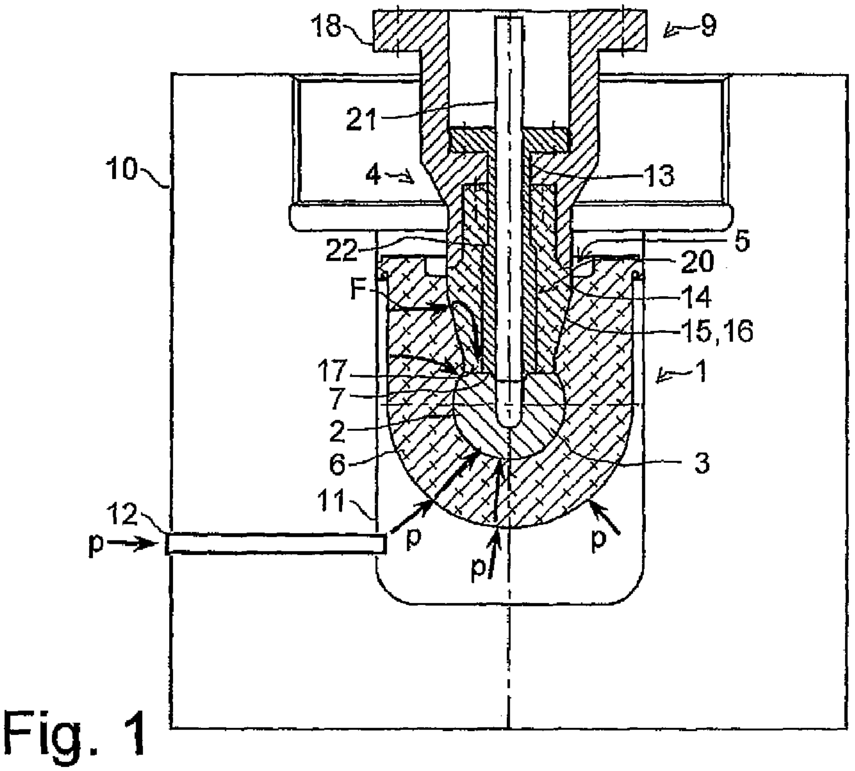

| | | | | | |
|---|---|---|---|---|---|
| 2,476,653 | A | | 7/1949 | Elberty et al. | |
| 3,591,903 | A | | 7/1971 | Bowles et al. | |
| 4,084,932 | A | * | 4/1978 | Morris et al. | 425/405.2 |
| 4,330,251 | A | * | 5/1982 | Lebas et al. | 425/405.2 |
| 4,615,859 | A | * | 10/1986 | Traut | 264/570 |
| 4,659,598 | A | | 4/1987 | Traut et al. | |
| 5,221,542 | A | * | 6/1993 | Coetzer | 425/436 R |
| 2004/0142179 | A1 | * | 7/2004 | Harada | 428/413 |
| 2006/0228247 | A1 | * | 10/2006 | Grohowski | 419/2 |

FOREIGN PATENT DOCUMENTS

| | | | |
|---|---|---|---|
| DE | 23 63 652 | A1 | 7/1974 |
| DE | 43 11 771 | A1 | 10/1994 |
| FR | 808 574 | A | 2/1937 |
| FR | 2 767 458 | A1 | 2/1999 |

OTHER PUBLICATIONS

DE 1604492, partial human translation Dec. 10, 1970.*

* cited by examiner

PRESSING APPARATUS AND PRESSING METHOD FOR THE ISOSTATIC PRESSING OF A MEMBER

The invention relates to a pressing device respectively to a pressing method.

Generally known are pressing devices for isostatic pressing of a body from a powdery and/or granulated material. Such presses comprise a die with a die wall forming a forming space and with a die opening, leading from outside the die through the die wall into the forming space. The die opening serves for filling the forming space with the powdery and/or granulated material and for removing a body pressed in the forming space after it has been pressed. The die wall is of elastic material, in order to compact the material to form the body by means of an isostatic compacting pressure applied to the outside of the die wall by corresponding deformation of the die wall and thus also deformation of the forming space. For closing the die opening during pressing, there serves a punch, which is inserted into the die opening after filling of the forming space.

By such a general isostatic pressing method there can be produced various bodies from powder, because powder, under pressure in an elastic die, will in case of doubt always be compacted somehow, and the result will be a solid body. Since it is hardly possible to produce sharp-edged contours, the method is always preferably applied, if bodies have to be produced by either radial compaction or by axially symmetrical compaction. Basic geometries of the body are a ball, a cylinder and a hollow cylinder with through hole or blind hole.

Known is also the combination of cylindrical and spherical geometries, with the basic geometries being formed in sections and separately from each other, as e.g. in a solid cylinder with spherical cap or in a sleeve with spherical bottom. Generally known is the pressing of hollow cylindrical bodies with spherical cap. They serve for example as ceramic diaphragm in sodium-sulphur accumulators. In such cases of combination it is assumed by implication that the powder will also be compacted in sections by square respectively cubic compaction, just like specified by the geometry of the die and the geometry of the steel pin of the punch.

The target is always a uniform distribution of density in the pressed body. Local differences in density in bodies pressed from powder will result in distortion during subsequent sintering because of differences in shrinkage. The resulting differences in internal strain result in cracks, and in particular fracture due to stress relief, and other defects in the pressed body.

If decision is made for pressing by purely square compaction, the result will be a filling space contour with singularities. If decision regarding pressing is made for purely cubic compaction, there are to be expected density gradients at the transition area between the steel punch and the elastic die. Generally speaking, cubic compaction to a ball would seem to be the more appropriate method and more preferable choice, because the ball constitutes the main geometry. This applies in particular in the case of the ball of a hip joint ball.

Therefore it is not possible to press e.g. spherical bodies with cylindrical or conical "interfering contour" on the inside wall. Bodies with overlapping cylindrical and cubic structures can not be pressed with such conventional pressing devices, as during pressing of the material there is going on square compaction in a cylindrical body, and this applies in particular also to bodies of tubular shape. During pressing of a ball, on the other hand, there is going on cubic compaction. Consequently there will be great problems to ensure a uniform density over the whole part, when pressing bodies of a mixed cubic and cylindrical structure.

An example of a body of oblong, in particular cylindrical or conical structures, and additionally spherical structures, is an artificial hip joint ball in a hip joint prosthesis. For this application range in particular, specially high quality is required, as cracks or wear after implantation into a human body may cause serious damage and even another operation may be necessary. It is for this reason that powder material of very high quality is used for producing such hip joint balls. Such materials are aluminum oxide, zirconium oxide or mixtures with additional constituents and doping agents, e.g. Yttrium. There can preferably be used only bioceramic materials of high strength and 100% bio-compatibility. These raw materials are very expensive.

At present, there exist two methods for producing of hip joint balls. According to the first method, solid balls are pressed by isostatic pressing, and are machined with great loss of material after pressing, respectively before sintering. Machining is carried out by removing material till the desired shape is achieved, and in particular with an oblong and cylindrical cavity being machined into the formed ball, for inserting a shank. According to the second method, a solid cylindrical body is pressed by isostatic pressing in the usual way. In this cylindrical body a blind hole can be formed already during pressing. Removal of material for a corresponding cylindrical opening in the ball is thus not required, and savings in raw material costs can be achieved. On the other hand, when using a cylindrical body, the loss of material during turning the body to spherical shape on a lathe is all the more higher.

The object of the invention is to provide a pressing device, respectively a pressing method, allowing forming of a pressed body of spherical-shape, respectively partly spherical-shape, as well as oblong-shape structures. The term structures of the body is to be understood as solid structures but also hollow structures, for example an oblong opening leading into a spherical solid structure. Therefore, there has to be found a pressing method and a tool structure for producing such bodies, by means of which there is effected on the one hand cubic compaction and on the other hand are eliminated the problems caused by an interfering cylindrical structure, which in fact is compacted in a theoretically correct way by cubic compaction.

This object is solved basing on a pressing device, in particular in the form of a pressing tool, for isostatic pressing of a body from a powdery and/or granulated material, with the pressing device comprising a die and a punch. The die with a die wall constitutes a forming space. A dies opening leads from outside of the die through the die wall to the forming space and serves for filling the forming space with the material and for removing the pressed body after the pressing. The die wall is made of an elastic material for compacting pressure applied to the outside of the die wall. The punch serves for closing the die opening during pressing. Such an arrangement is of advantage in that the punch is constituted by a metallic insert, with front end section of the insert penetrating into the forming space while closing the die opening.

Further, this object is solved basing on a pressing method for isostatic pressing of a body from powdery and/or granulated material in a die with an elastic die wall constituting a forming space, and with a die opening from outside of the die through the die wall into the forming space. According to this pressing method the forming space is filled with the material, then a punch for closing the die opening is inserted into the die opening, after that an isostatic compacting pressure is applied from outside to the die wall for compacting the material to the body, and after end of pressing, the punch is withdrawn form the die opening, and the body pressed in the forming space is removed through the die opening. This pressing method is of advantage in that a punch is being used which consist of a metallic insert in longitudinal direction and an elastic jacket surrounding the metallic insert, with a front end section of the insert being inserted into the forming space while closing the die opening.

By means of such a device as well as such a method, a combination of pressing spherical shapes and cylindrical shapes is made possible, making possible at the same time a noticeably reduced loss of material and a noticeably reduced effort in subsequent machining as compared to pressing of a solid ball, respectively of a cylinder. In particular, such a pressing device allows to ensure a nevertheless uniform density for forming of a completely homogenous body when pressing a body of such shape.

Due to the fact that the front end section of the insert penetrates into the forming space while closing the die opening, also the punch constitutes a part of the forming space, respectively of the filling space, when the tool is closed.

Of advantage in such a tool concept is the fact that there can be pressed a body, e.g. a hip joint ball with a pin hole, with the basis no longer being basic bodies in sections of geometrical shapes, but an overlapping of a spherical basic body and a cylindrical or conical basic body. This is a combination of cubic and square compaction by which uniform distribution of density is achieved.

It is of advantage, if the elastic jacket surrounding the insert, abuts closely to the insert without firm connection between the two in direction from the rear towards the front end section. It is preferred in this respect, if the elastic jacket surrounding the insert fits to the insert by sliding connection. In that way, the jacket can slide or be displaced in longitudinal direction along the insert, and can adapt itself freely to the conditions of pressure. A sliding jacket of such design on a steel punch allows improved, in particular optimized, compaction of a hip joint ball being the body, especially in the critical region between die and punch, because the necessary cubic compaction can be reproduced much better.

It is particularly preferred in this regard, if on the one hand the elastic jacket surrounding the insert is not firmly connected to the insert from the front end section in direction towards the rear over a sliding distance, and, on the other hand, the elastic jacket surrounding the insert is firmly connected to the insert starting from a connecting point at a distance from the front end section in direction towards the rear. This provides for good hold of the jacket, and defined alignment of the jacket in direction towards the forming space is made easier.

In an advantageous way, the elastic jacket surrounding the insert abuts so closely and/or tightly on the insert, at least in the area near the front end section, that the material in the forming space can not penetrate during pressing between the insert and the elastic jacket surrounding it. Thus loss of material and laborious subsequent machining for removing a pressing flash or projecting ends are avoided.

Of special advantage is a front jacket wall of the elastic jacket, with the front jacket wall ending at a distance of stress relief from the front end section in unstressed condition without compacting pressure being applied and ending at a distance of compaction from the front end section during pressing, respectively. In this way additional space is created for storing material, which subsequently under the effect of the pressing force can be compacted specifically also by the front jacket wall. Useful is a configuration of the elastic jacket in a way that the front jacket wall under the increasing effect of the compacting pressure can be displaced forward up to the front end section of the insert. The distance of stress relief corresponds to the pressing travel, which the jacket, because it is not connected to the steel punch, has to cover distance freely in order to achieve the same density also in this critical area. This means it is made possible for the elastic jacket to behave in the same way and to cover the same compaction travel as if no steel punch did exist. The geometry at the transition from steel punch to die can be noticeably improved, because the jacket can behave as if it did belong to the die. This is an essential difference as compared to a firmly vulcanized-on jacket, which, if applied, would stretch and lap around the steel punch. The arrangement with a sliding jacket also allows use of thin elastic jackets, because the required volume can be "fetched" from the rear area of the jacket.

An advantageous alternative solution to the slide ably jacket is a version in which the elastic jacket surrounding the insert being firmly connected, in particular vulcanized on or glued, to the insert in direction from the rear up to the front end section. With a fixed jacket, the jacket can produce the compaction travel only by itself by its own internal elasticity, which means that there must be available sufficient volume of elastic material. In such a case, the configuration of the inside of the die wall and the wall of the jacket at the front has to be correspondingly more complex.

For a preferred solution of transfer of force, the elastic jacket forms a wall of the jacket at a distance to the insert, respectively turned away from the insert, with the jacket wall abutting on an adjacent die opening wall while closing the die opening. In this way, direct abutment of the die opening wall on the metallic insert with a less advantageous course of the force lines is avoided. For improving the course of the force lines for deforming the elastic jacket, the elastic jacket forms a jacket wall with a contour leading away from the insert in the area of abutment on the adjacent die opening wall.

In an advantageous version, the insert is of hollow shape in longitudinal direction for receiving a core, which, while closing the die opening, penetrates into the forming space for shaping an oblong hollow structure in the body during pressing. Preferably the core is located in the insert in a way that it can be displaced in longitudinal direction. This allows a pressing method in which the core is introduced and penetrates into the forming space at least partly before the forming space is being filled, whereupon the forming space surrounding the core is being filled with the material to be compacted, and only after that the die opening is being closed by other components of the insert.

The punch preferably consists of the three parts; firstly the core, in the form of a core rod for forming a cylindrical inner contour of the body, for example a hip joint ball, secondly a punch, preferably from steel, which guides the core rod and forms a plane surface of the hip joint ball, and thirdly the elastic jacket, as an elastic shell surrounding the punch shaping the remaining spherical surfaces around the punch. This division into three parts is of advantage, because the opening of the die for demoulding the body must be large enough to get the body out. Since in particular the to be formed plane front face of a hip joint ball being the body is smaller in diameter than the largest ball diameter, part of the spherical outer contour is being formed also by the elastic jacket of the punch.

If the insert penetrates in longitudinal direction with a structured shape into the forming space, a correspondingly shaped hollow structure can be formed in the body during pressing.

In a preferred version, the insert comprises, at a distance in longitudinal direction from the forming space, a projection on its circumferential wall, and its circumference is increased in direction from the projection towards the forming space, in order to offer due to a correspondingly increased material thickness increased stability against the effect of the compacting pressure via the jacket during pressing, and in order to offer a defined point of application for location and/or fixing of the jacket.

The jacket and/or the die are preferably made from an elastomer, especially made from an elastomer on the basis of synthetic material and/or rubber. The two may also be of different shore hardness. The metallic insert is preferably made from steel.

A fixing device serves for fixing detachably the punch with the insert and the jacket in the die opening during pressing in a way that fixation is effected without application of additional pressing force to the punch in direction towards the die opening. Correspondingly the punch with the insert and the jacket is fixed in the die opening during pressing without application of additional pressing force to the punch in direction towards the die opening.

Such a pressing device, respectively such a pressing method, is preferably being used for producing the pressed body as essentially spherical hip joint ball with a penetrating and essentially cylindrical or conical shank locating opening. Independent of importance is correspondingly such manufactured pressed body being in the main a spherical hip joint ball having an elongate an essentially cylindrical shank location opening. The arrangement and combination of such methods, partial processes and tool configuration is well adapted to the geometries and requirements of hip joint balls as the body to be pressed.

Another advantage are considerable savings in material, as material removing machining to spherical shape and drilling of the longitudinal hole is not required, or can at least be noticeably reduced. Also the time effort required for such subsequent machining can consequently be reduced noticeably or completely. The core in the form of a steel pin permits forming of the desired oblong inner contour in the body the remaining shape of which is essentially spherical.

Savings in material are an important advantage in particular when producing hip joint balls, as for such purposes there has to be used a very pure and, therefore, also very expensive material, in particular on the basis of high-purity alumina and zircon. In addition damage to the structure during subsequent machining, which later—after implantation in a human body might in the worst case result in fracture of the hip joint ball, is avoided.

An embodiment of the invention is explained below in more detail on the basis of the drawing. There is shown in:

FIG. 1 a pressing device, in side view and partial sectional view, at an initial stage of a pressing process, FIG. 2 the pressing device according to FIG. 1 with the material already compacted to a body, FIG. 3 the pressing device shown in FIG. 1 at a later moment before removal of the body pressed therein, FIG. 4 an enlarged detail of FIG. 3 and FIG. 5 an enlarged detail according to an alternative embodiment.

Figure 2:
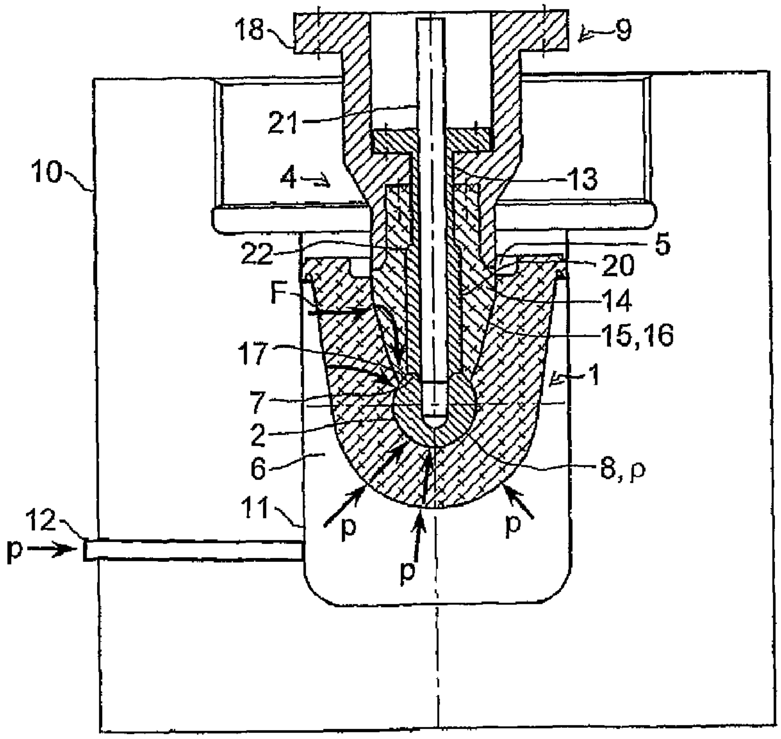

The FIG. 1-4 show a partial sectional view of a pressing device according to a first embodiment. As can be seen, a pressing device comprises as essential element a die 1, delimiting by its die wall 6 an inside forming space 2. The die 1 comprises a die opening 5, passing through the die wall 6 from an outside surface of the die 1 into the forming space 2. The die opening 5 serves for filling the forming space 2 with a powdery and/or granulated material 3 (FIG. 1). By applying an isostatic compacting pressure p to the outside of the die wall 6, the material 3 is being formed and compacted inside the forming space 2 to a pressed body 8 (FIG. 2). To make this possible, the die wall is made from elastic material. As elastic material there can be used a conventional material on the basis of synthetic material or natural rubber for example.

For closing the die opening 5 after filling of the forming space 2 with the material to be compacted 3, a punch 4 is inserted into the die opening 5. Inserting of the punch 4 is preferably carried out by means of a fixing device 9 in a way that the punch 4 closes the die opening 5, with no pressure having to be applied in direction towards the forming space 2. The fixing device 9 fixes the punch 4 in the die 1 relative to a tool lower part 10, in which the die 1 is located. The tool lower part 10 comprises a pressing space 11 surrounding the die 1 completely. A top surface of the die 1 is designed and dimensioned in a way that via a collar of the die 1 the pressing space 11 is closed to the outside. The die opening 5 is in the area of the collar and leads to an area outside the forming space of the tool lower part 10. Into the pressing space 11 there leads a pressure pipe 12 from an outside of the tool lower part 10, the pressure pipe 12 serving for applying the compacting pressure p to the die wall 6 of the die 1.

The pressing device consisting mainly of the die 1 and the punch 4 is designed for pressing a body 8, comprising at least one spherical or partly spherical body structure as well as an oblong, in particular cylindrical, body shape. In the example of the version shown, the body 8 is constituted by a ball, into which there leads from the outside an essentially cylindrical opening. The body 8 shown is in particular a body for providing an artificial hip joint ball, in the oblong opening of which a shank is to be inserted. Direct production of such a spherical body with an already integrated oblong opening allows considerable savings in material during subsequent machining, which perhaps may not even be required at all, as neither in the area of the outside circumference of the already spherical body 8 nor for providing the oblong opening large quantities of material have to be removed.

In order to be able to provide such a body 8, the punch is made from two components, i.e. from a metallic insert 13 extending in longitudinal direction and an elastic jacket 14 surrounding the metallic insert 13. In direction of its face or front, the insert 13 protrudes from the jacket 14 with its front end section 7. When it closes the die opening 5, the metallic insert 13 penetrates with its front end section 7 into the forming space 2.

The jacket 14 surrounding the insert 13, with a jacket wall 15, i.e. its outer circumferential wall, arranged at a distance from the insert 13, abuts on an inner die opening wall 16 of the die opening 5. The jacket 14 is shaped and dimensioned in such a way, that, when the die opening 5 is being closed, the jacket 14 abuts on the insert 13 so closely, that powder or granulate from the forming space 2 can not penetrate between the two. In addition, the jacket 14 with the jacket wall 15 abuts on the die opening wall 16 so closely that powder or granulate from the forming space 2 can not penetrate between the two. The jacket 14 is made from an elastic material, in particular an elastomer on the basis of synthetic material or natural rubber. Depending on the desired dimension, structure and quality of the body 8 to be pressed, the elastic jacket 14 and the die wall 6 may be of different material. In particular, the shore hardness of these materials may be different.

In order to allow a preferred flow of forces and a preferably uniform compaction travel up to the insert 13, when applying the isostatic compacting pressure p to the outside of the die wall 6, the jacket wall 15, starting from the forming space 2, preferably is not rectilinear parallel to the outside wall of the insert 13, but inclined or inclined in arc-shape at an angle, in a direction towards the rear away from the insert 13. In this way, lines of force F running on the side of the die wall 6 along the die opening wall 16 are deflected in a way that the front jacket wall 17 facing the forming space 2 is being moved into the forming space 2, in order to compact the material therein. As an option there exists hereby a sliding connection between the outside jacket wall 15 and the die opening wall 16.

The insert 13 as well as the elastic jacket 14 are supported or fixed at the rear in a punch base 18 of the punch 4. The connection from the jacket 14 to the insert 13, on the other hand, can be constituted by different ways and means.

Figure 5:
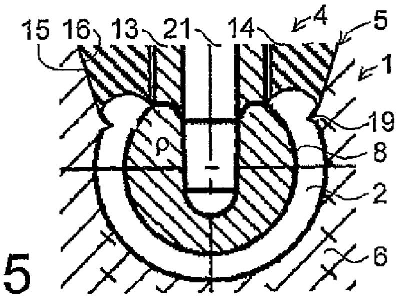

According to a first version of embodiment, the inside wall of the jacket 14 and the outside circumference of the insert 13 are firmly connected to each other in direction from the rear up to the front end section 7, as this is shown in FIG. 5. For providing the firm connection, especially the jacket 14 can be vulcanised or glued onto the insert 13. In such a version, however, there is needed a configuration of the front jacket wall 17 and of the inside wall of the die 1, requiring considerable effort, in order to ensure, when applying the isostatic compacting pressure p, that a desired density p will be achieved also in an area of the body before the front end section 7 of the insert 13.

According to a more preferred second version of embodiment, the jacket 14, with its inside wall abuts in loose contact on the outside wall of the insert 13 and can be displaced in longitudinal direction. The jacket 14 fits on the insert 13 so tightly that, during pressing, no material 3 can penetrate from the forming space 2 and get between the jacket 14 and the insert 13.

Figure 4:
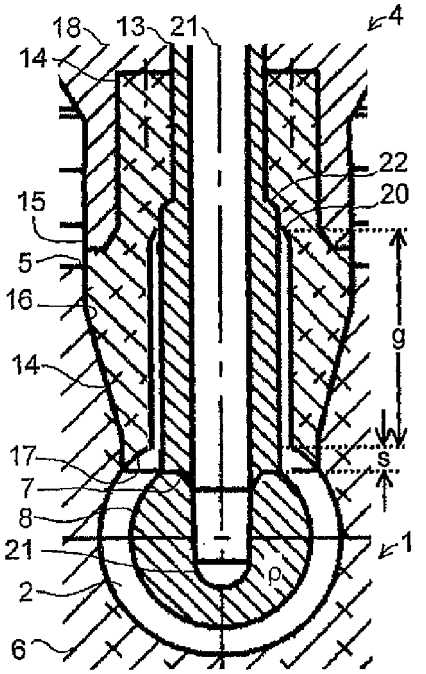

According to the most preferred third version of embodiment, which is outlined in FIG. 4, the elastic jacket 14 surrounding the insert 13 is not tightly connected to the insert 13 from the front end section 7 of the insert 13 in direction towards the rear over a sliding distance g, which is outlined in FIG. 4 by an exaggerated arrangement at a distance. This means, between the jacket 14 and the insert 13 there is a sliding connection, so that the front jacket wall 17 is located on the outside circumference of the insert 13 and is displaceable in direction towards the forming space 2, and away from it, respectively. Starting from a point of connection 20 at the end of the sliding distance g, the jacket 14 is firmly connected, for example vulcanized or glued, to the insert 13 in direction towards the rear.

Like in the other versions of embodiment, the elastic jacket 14 surrounding the insert 13 abuts at least near the front end section 7 so closely and/or tightly, that the material 3 being in the forming space 2 can not penetrate during pressing between the insert 13 and the elastic jacket 14 surrounding it.

In the second as well as in the third version, dimensioning of the elastic jacket 14 is preferred in a way that in unstressed condition, without compacting pressure p being applied, the jacket 14 ends with its front jacket wall 17 at a distance of stress relief s to the front end section 7 of the insert 13 in direction towards the rear. This means, in unstressed condition, the front jacket wall 17 of the elastic jacket 14 does not penetrate into the forming space 2 as far as the front end section 15 of the insert 13. This allows filling with material 3 of the space thus created on the side of the front end section 7 and subsequent compaction of this material by means of the front jacket wall 17 of the jacket 14, and this makes it possible to achieve a particularly uniform density also in the area of transition before the front end section 7 and a projection provided at the front of this end section. Due to the sliding connection between the insert 13 and the jacket 14, the front jacket wall 17 is moved forward up to level towards the front end section 7 of the insert 13, unless there is desired a special contour with a stepped configuration of the body.

Advantageously the front end section 7 of the insert 13 can be designed in the form of a structure, in order to emboss a corresponding counter structure on the body 8 being formed during pressing. In particular there can penetrate, from the front end section 7, a projection, for example a cylindrical projection, further into the forming space 2, in order to form a corresponding opening in the body 8.

According to a specially preferred version of embodiment, the insert 13 is of hollow configuration in longitudinal direction for locating a core 21, with the core 21, when closing the die opening 5, penetrating into the forming space 2, in order to form during pressing a corresponding oblong hollow structure in the body 8.

Preferably the core 21 is located in a way that it can be displaced in the inert 13. This allows to insert the core 21 partly or completely into the forming space 2 already before or during filling of the forming space 2 with the material 3 to be compacted. In this way material compaction at the face during inserting the core 21 later can be avoided. Due to the fact that the core 21 is located in the insert 13 in a way that it can be displaced, it is possible, after the forming space 2 has been filled completely with the material 3 to be compacted, to insert the remaining components of the punch 4, i.e. in particular the insert 13 with the jacket 14, by means of the fixing device 9 into the die opening 5 in order to close it. Furthermore locating the core 21 in the insert 13 in a way that it can be displaced, allows, after pressing of the body 8, to withdraw the core 21 from the body 8 by control, while the front end section 7 still abuts on the body 8 and constitutes an abutment for the traction movement of the core 21 out from the body 8.

In an advantageous way the pressed body, after pressing, adheres to the core and can, therefore, be removed from the forming space together with the punch, and only thereafter will be detached from the punch.

Preferably the wall of the insert 13, in case of a configuration as solid body as well as in case of configuration as hollow body for inserting the core 21, is of a more solid configuration, which means with a larger diameter, in the area between the die opening 5. Thus it is easier to withstand the pressing forces of the isostatic compacting pressure p acting from the side via the die wall 6 and the elastic jacket 14. In direction towards the rear the diameter of the insert 13 diminishes advantageously in the area of a projection 22. The diminution allows savings in material and, in particular in the case of a configuration of a marked projection 22, also support of a connection between the jacket 14 and the insert 13 in the form of a defined point of hold.

Figure 3:
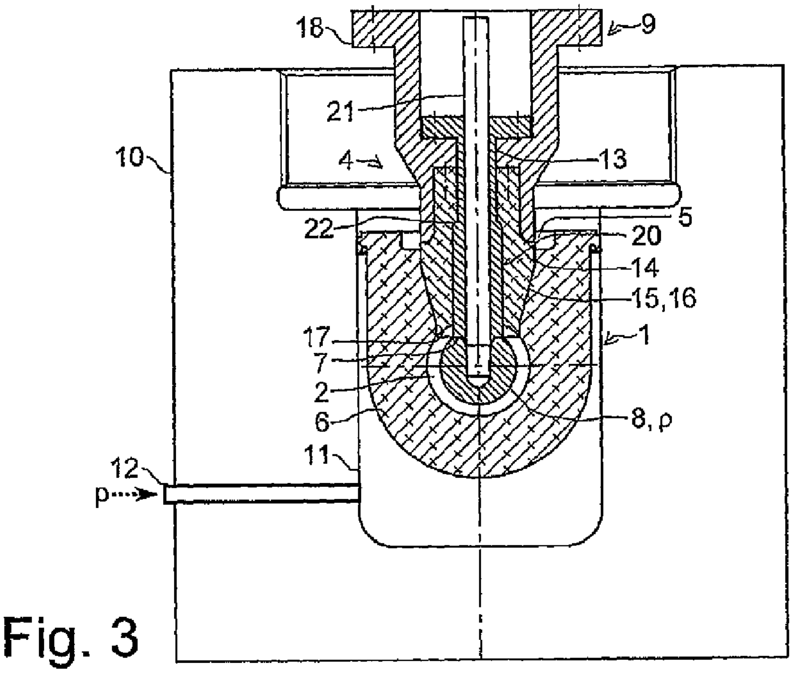

By means of the FIG. 1-3 three different stages of a pressing method are shown. FIG. 1 shows a first stage, in which the forming space 2 is filled with the powdery and/or granulated material 3. As material 3 to be compacted there can be used in particular metallic or ceramic materials. For forming of hip joint balls, a material on the basis of pure or nearly pure alumina is particularly preferred. There is shown in FIG. 1 a condition with punch 4 inserted into the die opening 5, with no isostatic forces acting yet on the die wall 6. FIG. 2 shows a process step, in which the isostatic compacting pressure p acts on the die wall 6 and leads to deformation of the die wall 6 of the die 1 and to deformation of the elastic jacket 14. As a result of the deformations, the forming space 2 becomes smaller, and the material in it is compacted to the body 8. FIG. 3 shows a third process step after decrease of the isostatic compacting pressure and stress relief of the die 1 and of the jacket 14. On the front end section 7 there is seated on the core 21 the formed body 8, which can be removed from the forming space 2 together with the punch 4 or after detaching and removing the punch 4.

The invention claimed is:

1. A pressing device for isostatic pressing of a body from powdered and/or granulated material, comprising:

a die comprising a die wall, wherein the die wall defines a forming space, the die wall comprising an elastic material, wherein the elastic material allows the pressing of the material in the forming space through isostatic pressure applied to the outside surface of the die wall, and the die further comprising a die opening extending through the die wall and connecting the forming space with the exterior of the die, wherein the die opening is configured to allow filling of the forming space with powdered and/or granulated material and to allow the removal of the pressed body from the forming space, and a punch configured to close the die opening during pressing, the punch having a front end that is inside the forming space and a back end that is outside the forming space, the punch comprising:

a metallic insert, wherein the front end of the insert penetrates into the forming space and wherein the back end of the insert is outside the forming space; and, an elastic jacket circumferentially surrounding the metallic insert, wherein the front end of the elastic jacket penetrates into the forming space, wherein the back end of the elastic jacket is outside the forming space, wherein the die wall presses on the outer circumferential side wall of the front end of the elastic jacket when isostatic pressure is applied to the outside surface of the die wall, and wherein the isostatic pressure applied to the outer circumferential side wall of the elastic jacket forces the front wall of the elastic jacket further into the forming space.

2. A pressing device according to claim 1 wherein the elastic jacket slidably abuts the insert from a location at which the elastic jacket is affixed and extending towards the front end section of the insert.

3. A pressing device according to claim 1, wherein the elastic jacket abuts the insert such that material in the forming space does not penetrate the space between the jacket and the insert during pressing.

4. A pressing device according to claim 1, wherein the front end of the elastic jacket terminates distal of the front end of the insert when the elastic jacket is uncompressed by the die wall.

5. A pressing device for isostatic pressing of a body from powdered and/or granulated material, comprising a die comprising an elastic die wall configured for use with isostatic pressure applied to the outside of the die wall in compacting material, and further configured to define a forming space, the die wall comprising a die opening configured for use in filling the forming space with material and for removing the pressed body, the die opening extending through the die wall and connecting the forming space with the die exterior, and a punch configured to close the die opening during pressing, the punch having a front end that is inside the forming space and a back end that is outside the forming space, wherein the punch comprises a metallic insert, wherein the front end of the insert penetrates into the forming space when the die is closed and wherein the back end of the insert is outside the forming space; and, an elastic jacket, wherein the elastic jacket is fixedly vulcanized or adhered to the insert at a location distal of the front end of the insert, wherein the front end of the elastic jacket penetrates into the forming space, wherein the back end of the elastic jacket is outside the forming space, wherein the die wall presses on the outer circumferential side wall of the front end of the elastic jacket when isostatic pressure is applied to the outside surface of the die wall, and wherein the isostatic pressure applied to the outer circumferential side wall of the elastic jacket forces the front wall of the elastic jacket further into the forming space.

6. A pressing device of claim 1, wherein the elastic jacket comprises a front end located distal of the front end of the insert, and wherein the front end of the elastic jacket abuts the die opening when the die opening is closed by the punch.

7. A pressing device according to claim 6, wherein the jacket wall firmly contacts the adjacent die opening wall during pressing.

8. A pressing device according to claim 6, wherein the elastic jacket in the area of abutment on the adjacent die opening wall comprises a jacket wall having a contour leading away from the insert.

9. A pressing device according to claim 1, wherein the insert comprises a longitudinally extending hollow structure configured to receive a core, wherein the core extends into the forming space when the punch is, positioned to close the die opening, wherein the core is configured to form an oblong hollow structure within the body during pressing.

10. A pressing device according to claim 9, wherein the core is positioned in the insert to allow longitudinal displacement of the core.

11. A pressing device according to claim 1, the insert further comprising a structured shape, wherein the insert is configured to longitudinally extend into the forming space to form a hollow structured shape in the body that corresponds to the structured shape of the insert.

12. A pressing device according to claim 1, wherein the insert further comprises a projection on the circumferential wall of the insert, the projection having an increased external circumference extending from a location on the insert, distal from the front end section, to the front end section of the insert.

13. A pressing device according to claim 1, wherein the jacket and/or the die comprise an elastomer.

14. A pressing device according to claim 1, further comprising a fixing device for detachably fixing the punch, the insert, and the jacket in the die opening during pressing without application of additional pressing force to the punch in direction of the die opening.

15. A pressing device according to claim 1 configured to produce a hip joint ball pressed body comprising a penetrating shank locating opening.

16. A pressing method for pressing a body from a powdery and/or granulated material, the method comprising:

providing a pressing device according to claim 1, filling the forming space with the material, inserting a punch into the die opening for closing the die opening, applying an isostatic compacting pressure to an outside of the die wall for compacting the material to the body, and removing the punch from the die opening after pressing, wherein a front end section of the insert is inserted into the forming space while closing the die opening.

17. A pressing method according to claim 16, wherein, before filling the forming space, the punch is inserted penetrating into the forming space at least partly, whereupon the forming space surrounding the core is filled with the material, and only after that the die opening is closed by other components of the insert.

18. Pressing method according to claim 16, wherein the punch with the insert and the jacket is fixed in the die opening during pressing without application of additional pressing force.

19. A pressing method for pressing a body from a powdery and/or granulated material, the method comprising:

providing a pressing device according to claim 5, filling the forming space with the material, inserting a punch into the die opening for closing the die opening, applying an isostatic compacting pressure to an outside of the die wall for compacting the material to the body, and removing the punch from the die opening after pressing, wherein a front end section of the insert is inserted into the forming space while closing the die opening.

20. A pressing method according to claim 19, wherein, before filling the forming space, the punch is inserted penetrating into the forming space at least partly, whereupon the forming space surrounding the core is filled with the material, and only after that the die opening is closed by other components of the insert.

21. Pressing method according to claim 19, wherein the punch with the insert and the jacket is fixed in the die opening during pressing without application of additional pressing force.

* * * * *